United States Patent [19]

Hovnanian

[11] Patent Number: 5,211,005
[45] Date of Patent: May 18, 1993

[54] HIGH DENSITY FUEL INJECTION MANIFOLD

[75] Inventor: Camer V. Hovnanian, Fairfield, Conn.

[73] Assignee: Avco Corporation, Providence, R.I.

[21] Appl. No.: 870,619

[22] Filed: Apr. 16, 1992

[51] Int. Cl.$^5$ .................. F23R 3/28; F02C 7/22
[52] U.S. Cl. .................. 60/39.32; 60/39.36; 60/739
[58] Field of Search .......... 60/734, 739, 39.36, 60/39.32

[56] References Cited

U.S. PATENT DOCUMENTS

| | | | |
|---|---|---|---|
| 2,970,438 | 2/1961 | Howald | 60/739 |
| 3,339,616 | 9/1967 | Ward, Jr. et al. | |
| 4,337,616 | 7/1982 | Downing | |
| 4,387,559 | 6/1983 | Leto | 60/39.32 |
| 4,402,184 | 9/1983 | Faulkner et al. | |
| 4,467,610 | 8/1984 | Pearson et al. | 60/739 |
| 4,603,548 | 8/1986 | Ishibashi et al. | 60/39.06 |
| 4,675,221 | 6/1987 | Lalikos et al. | |
| 4,802,334 | 2/1989 | Eder et al. | 60/739 |
| 4,862,693 | 9/1989 | Batakis et al. | 60/739 |
| 4,903,478 | 2/1990 | Seto et al. | 60/739 |
| 5,036,657 | 8/1991 | Seto et al. | 60/739 |

FOREIGN PATENT DOCUMENTS 840529 7/1960 United Kingdom .................. 60/739

*Primary Examiner*—Richard A. Bertsch
*Assistant Examiner*—Timothy S. Thorpe
*Attorney, Agent, or Firm*—Perman & Green

[57] ABSTRACT

A fuel injection system for use in the combustor section of a gas turbine engine is provided with first and second manifolds of toroidal configuration. First outlet nozzles of a plurality of fuel injectors associated with the first manifold are positioned at spaced circumferential locations lying in a common plane at similar radial distances from the centerline of the engine. Second outlet nozzles of a plurality of fuel injectors associated with the second manifold are similarly positioned but evenly spaced from the first outlet nozzles. Fittings for the fuel injectors are joined by means of flexible tubing and are similarly joined to a fuel inlet fitting for connection to a source of fuel. By providing a pair of separate manifolds and flexible tubing interconnecting the fittings of adjacent pairs of fitting for the injectors, outlet nozzles for the fuel injectors can achieve a more dense configuration, their assembly and maintenance can be substantially simplified, and vibratory stresses are minimized.

13 Claims, 3 Drawing Sheets

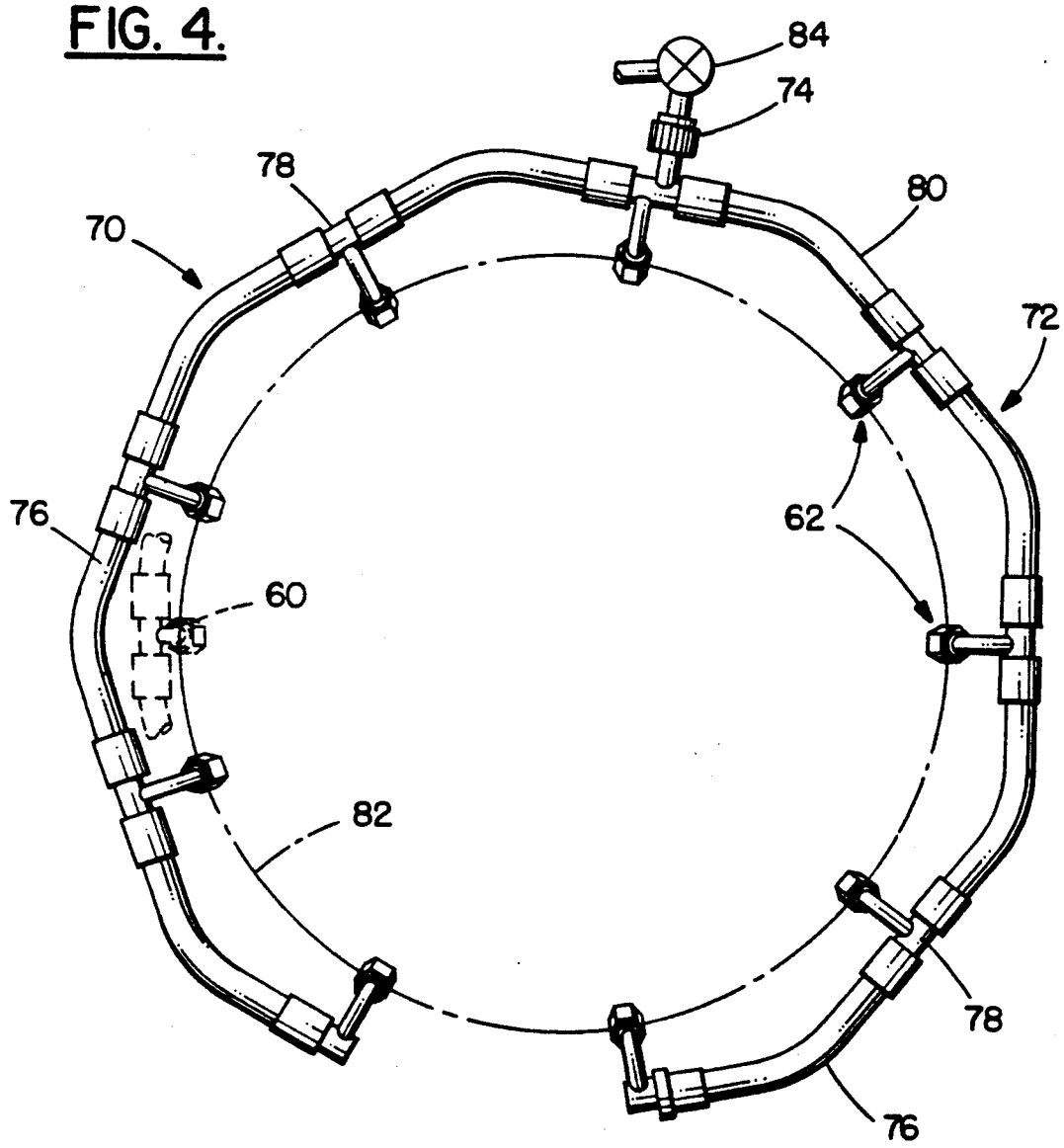

HIGH DENSITY FUEL INJECTION MANIFOLD

BACKGROUND OF THE INVENTION

1. Field of the Invention

This invention relates generally to fuel injection systems for gas turbine engines and, more particularly, to a fuel injection system which provides a greater density of fuel injector nozzles within the combustion chamber of a gas turbine engine.

2. Description of the Prior Art

As is well known, gas turbine engines typically include a rotor and a turbine wheel rotatable about a generally horizontal axis. Not infrequently, an annular combustor surrounds the axis and is provided with a plurality of angularly spaced fuel injectors whereby fuel is injected into the combustor to be burned and ultimately directed at the turbine wheel to spin the same. At a location that is usually external of the combustor, a ring-like manifold is utilized as a fuel manifold that interconnects the various fuel injectors. Because the rotational axis of the compressor and turbine wheel is typically horizontal, the ring-like manifold lies in a vertical plane.

A typical conventional construction of a fuel injection system for a gas turbine engine is disclosed in U.S. Pat. No. 4,862,693. In that patent, a generally toroidal shaped manifold is provided with a plurality of spaced injectors which are joined by a plurality of rigid tube sections.

In another construction as disclosed in U.S. Pat. Nos. 4,903,478 and 5,036,657, a fuel injection system for use in the combustor section of a gas turbine engine comprises a first and a second plurality of fuel nozzles which are in fluid supply communication with first and second fuel manifolds, respectively. The manifolds are supplied with fuel by first and second fuel lines, respectively, which in turn are supplied from a fuel control. A portion of the fuel nozzles is interruptible in response to a predetermined gas turbine engine parameter or condition. In one instance, the engine parameter is the fuel to air ratio and in another instance, the engine condition is descent as indicated by the power setting of the gas turbine engine. In still another instance, the fuel control may be controlled by a digital electronic computer.

The technical requirements for the latest generation of gas turbine engines call for ever higher combustor efficiencies. A very important factor for achieving increased efficiency is the proximity of the fuel nozzles within the combustor. At the same time it is necessary to place the fuel nozzles on substantially the same pitch circle which necessitates decreased distance between the associated fittings of adjoining fuel nozzles. A point is reached at which further reduction in the distance between fuel nozzles along the pitch circle can no longer be accommodated using conventional construction techniques. It was to satisfy this requirement and, in light of the prior art as indicated above, that the present invention has been conceived and is now reduced to practice.

SUMMARY OF THE INVENTION

The present invention relates to a fuel injection system for use in the combustor section of a gas turbine engine which includes first and second manifolds of toroidal configuration. First outlet nozzles of a plurality of fuel injectors associated with the first manifold are positioned at spaced circumferential locations lying in a common plane at similar radial distances from the centerline of the engine. Second outlet nozzles of a plurality of fuel injectors associated with the second manifold are similarly positioned but evenly spaced from the first outlet nozzles. Fittings for the fuel injectors are joined by means of flexible tubing and are similarly joined to a fuel inlet fitting for connection to a source of fuel. By providing a pair of separate manifolds, and flexible tubing interconnecting the fittings of adjacent pairs of fitting for the injectors, outlet nozzles for the fuel injectors can achieve a more dense configuration, their assembly and maintenance can be substantially simplified, and vibratory stresses are minimized.

A primary object of the invention, then, is to assure maximum density of fuel nozzles within the combustor of a gas turbine engine while assuring ease of assembly and of maintenance of the system.

Another object of the invention is to provide a dual fuel injection system which will assure continued operation of the gas turbine engine in the event one of the manifolds should become inoperative.

Still another object of the invention is to provide a fuel injection system which substantially eliminates high hoop and vibratory stresses within the system.

Yet another object of the invention is to provide a fuel injection system with substantially improved life cycle fatigue characteristics.

A further object of the invention is to provide a fuel injection system having the foregoing features at minimal cost, using standard parts, and requiring minimal cost for assembly and maintenance.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and, together with the description, serve to explain the principles of the invention in general terms. Like numerals refer to like parts throughout the disclosure.

BRIEF DESCRIPTION OF THE DRAWINGS

FIG. 4 is a front elevation view of another fuel manifold constructed according to the invention.

DESCRIPTION OF THE PREFERRED EMBODIMENT

Figure 1:
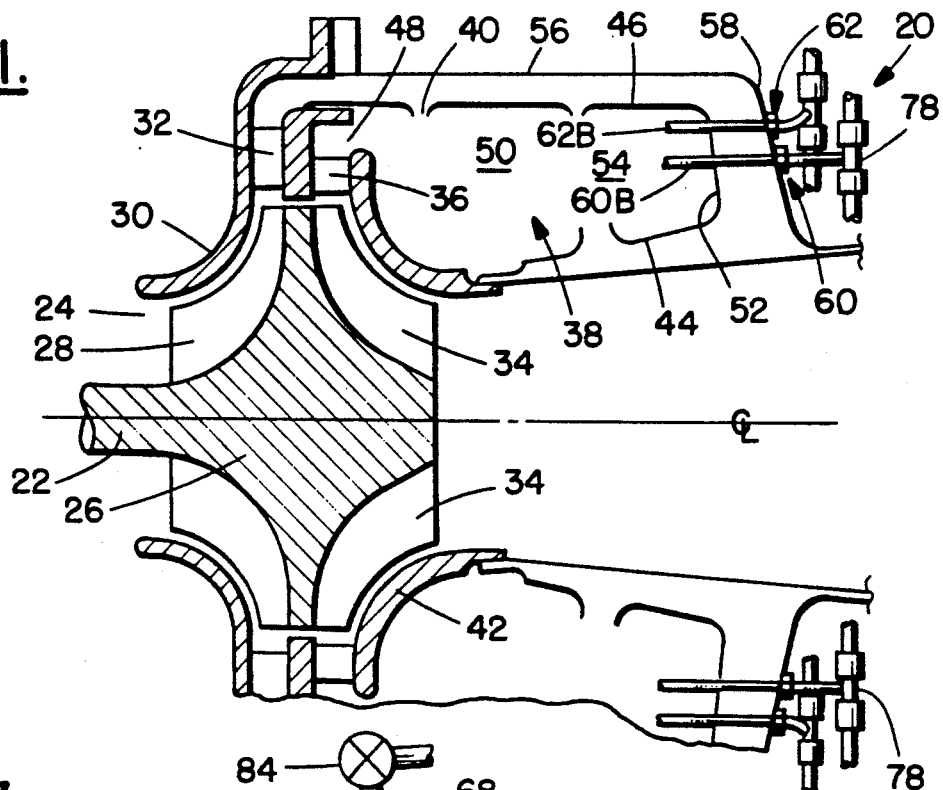
FIG. 1 is a schematic sectional view of a portion of a typical gas turbine engine which embodies the present invention.

Turn now to the drawings and initially to FIG. 1 which illustrates an exemplary embodiment of a gas turbine engine 20 constructed according to the invention and being of a radial flow configuration. However, the invention is not limited to radial flow gas turbine engines and may have applicability to any form of air breathing gas turbine engine having a plurality of circumferentially spaced fuel injectors.

The engine 20 includes a rotary shaft 22 journaled on bearings not shown. Adjacent one end of the shaft 22 is an air inlet 24. The shaft 22 mounts a rotor, generally designated 26, which may be of conventional construction. Accordingly, the same includes a plurality of compressor blades 28 adjacent the inlet 24. A compressor blade shroud 30 is provided in adjacency thereto and just radially outwardly of the radially outer extremities of the compressor blades 28 is a conventional diffuser 32.

Opposite the compressor blades 28, the rotor 26 has a plurality of turbine blades 34. Just radially outwardly of the turbine blades 34 is an annular nozzle 36 which is adapted to receive hot gases of combustion from an annular combustor, generally designated 38. The compressor system including the blades 28, shroud 30 and diffuser 34 delivers air to the annular combustor 38 and via dilution air passages 40, to the nozzle 36 along with the gases of combustion. That is to say, hot gases of combustion from the combustor are directed via the nozzle 36 against the blades 34 to cause rotation of the rotor 26, and thus rotation of the shaft 22. The latter may be, of course, coupled to some sort of apparatus requiring the performance of useful work.

A turbine blade shroud 42 is interfitted with the combustor 38 to close off the flow path from the nozzle 36 and confine the expanding gas to the area of the turbine blades 34.

The combustor 38 has a generally cylindrical inner wall 44 and a generally cylindrical outer wall 46. The two are concentric and merge to a necked down area 48 which serves as an outlet from an interior annulus 50 of the combustor 38 to the nozzle 36. A third wall 52, generally concentric with the walls 44 and 46, extends generally radially to interconnect the walls 44 and 46 and to further define the annulus 50.

Opposite the outlet 48 and adjacent the wall 52, the interior annulus 50 of the combustor 38 includes a primary combustion zone 54 in which the burning of fuel primarily occurs. Other combustion may, in some instances, occur downstream from the primary combustion zone 54 in the direction of the outlet 48. As mentioned earlier, provision is made for the injection of dilution air through the passages 40 into the combustor 38 downstream of the primary combustion zone to cool the gases of combustion to a temperature suitable for application to the turbine blades 34 by the nozzle 36.

In any event, it will be seen that the primary combustion zone is an annulus or annular space defined by the generally circumferential inner wall 44, the generally circumferential outer wall 46 and the wall 52. However, as will be appreciated by those skilled in the art from the following description, the combustor need not be an annular combustor, but could be comprised of a plurality of generally cylindrical combustors, each having a pair of fuel injectors.

Figure 2:
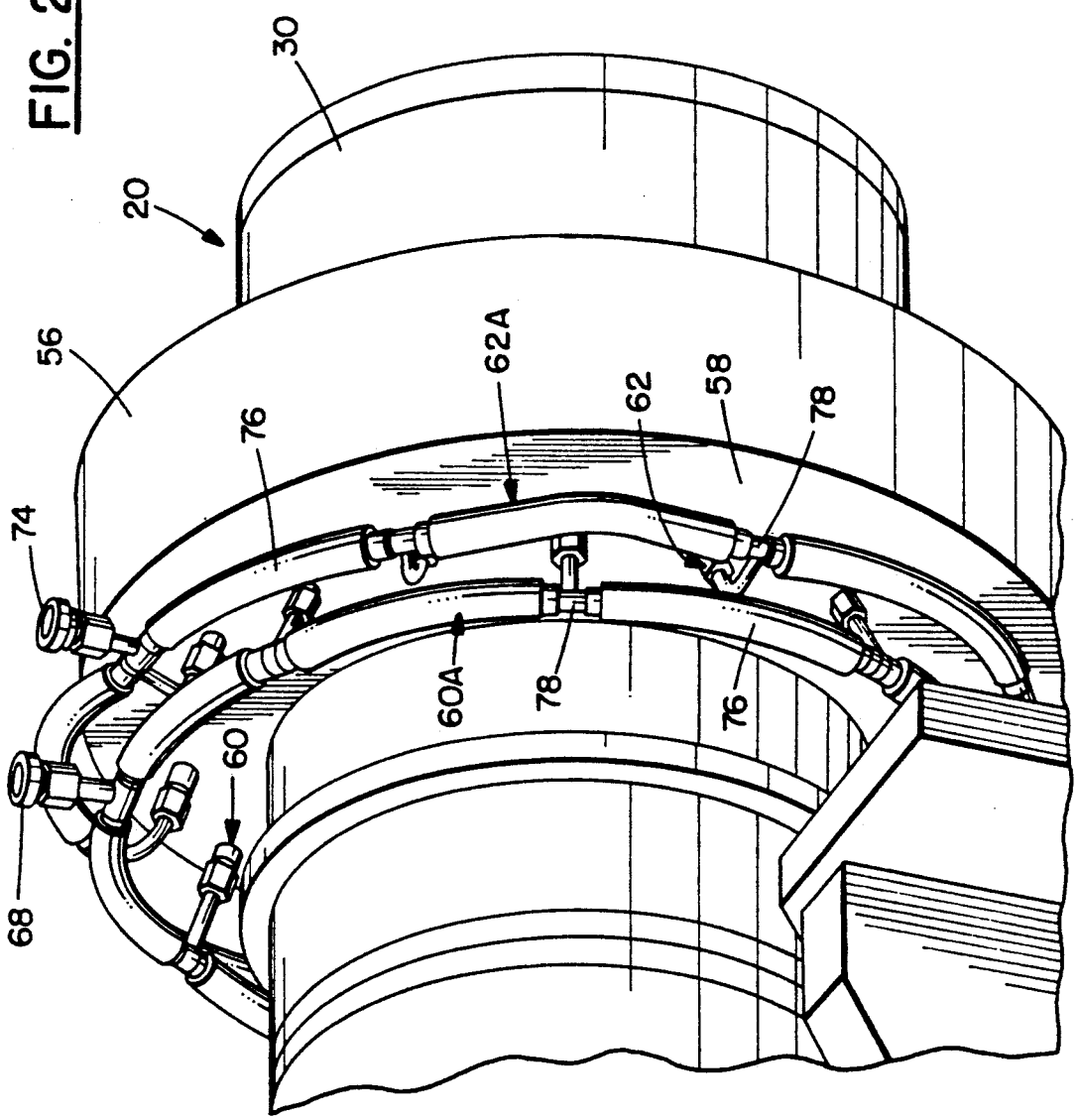
FIG. 2 is a perspective view illustrating a part of the engine illustrated in FIG. 1 and incorporating the invention.

Continuing with the description of FIG. 1, a further wall 56 is generally concentric with the walls 44 and 46 and is located radially outward of the latter. The wall 56 extends to the outlet of the diffuser 32 and thus serves to contain the direct compressed air from the compressor system to the combustor 38. A radially inwardly directed extension 58 of the wall 56 is spaced from the wall 52 to further define the compressed air passage about the combustor 38. Mounted on and extending through the wall 56 as well as the wall 52 are a plurality of first fuel injectors 60 and a plurality of second fuel injectors 62. The first injectors 60 are connected to a first common manifold 60A (see FIGS. 1, 2, and 3) and the second injectors 62 are connected to a second common manifold 62A (see FIGS. 1, 2, and 4). For purposes of clarity, the fuel injectors 60 and 62 are illustrated as being at different radial positions. In actual fact, they are positioned at substantially similar radial distances from the centerline of the engine. During normal operation of the engine 20, the axis of rotation of the shaft 22 is horizontally disposed and thus it will be appreciated that the manifolds 60A and 62A will generally lie in spaced apart vertical planes with the injectors 64, 62 directed generally horizontally and axially into the primary combustion zone 54.

In the illustrated embodiment, nine injectors 60 on the manifold 60A are equally angularly, or circumferentially, spaced about the axis of rotation of the shaft 22 and nine injectors 62 are, in similar fashion, equally angularly, or circumferentially, spaced on the manifold 62A. Furthermore, the injectors 60 are connected into one or the other of two legs, 64, 66 of the manifold 60A. The two legs 64 and 66 join at a fitting 68 at the normally uppermost part of the manifold 60A which is intended to be connected to a source of fuel at varying pressures dependent upon desired fuel flow. In a similar manner, the injectors 62 are connected into one or the other of two legs 70, 72 of the manifold 62A and the legs 70, 72 join at a fitting 74 located generally proximate the fitting 68 at the normally uppermost part of the manifold 62A. Like the fitting 68, the fitting 74 is intended to be connected to a source of fuel.

Each leg 64, 66 of the manifold 60A and each leg 70, 72 of the manifold 62A is comprised of a plurality of flexible tubular sections 76 having the configuration shown and which are joined by T-fittings 78 which additionally mount the injectors 60, 62. Additionally, flexible tubular sections 80 join each of the uppermost T-fittings to its adjacent fuel connection fitting 68, 74. The tubular sections 80 are substantially similar to the sections 76. The inside diameter of the tubular sections may be the same. Alternatively, although not shown in any of the figures, the inside diameter of the tubular sections 76 may progressively become smaller in each of the legs 64, 66, 70, 72 as one advances in a direction away from the inlet fittings 68, 74, respectively. In either event, the construction should provide a sufficient interior cross sectional area within the manifolds to allow the requisite quantity of fuel to flow to the various injectors 60, 62. Thus, at locations adjacent the fittings 68, 74, the cross sectional area of the tubular sections 76 will be sufficient to allow adequate fuel flow to all of the injectors downstream from that location while at locations closer to the terminal regions of each leg, the cross section will be sufficient to supply adequate fuel but to a single one of the injectors.

Each of the flexible tubular sections 76 is composed of a material or materials which can withstand high temperatures, and which is/are abrasion resistant, corrosion resistant, and fire resistant. Such a capability may be provided by use of special hose, commercially available, constructed of extruded polytetrafluoroethylene tube reinforced with wire braid of corrosion resistant steel and including an integral silicone fire sleeve. A typical material is sold by Stratoflex Aerospace/Military Connectors Division of Parker Hannifin Corporation, Ft. Worth, Tex. under the trademark STRATOFLEX.

Figure 3:
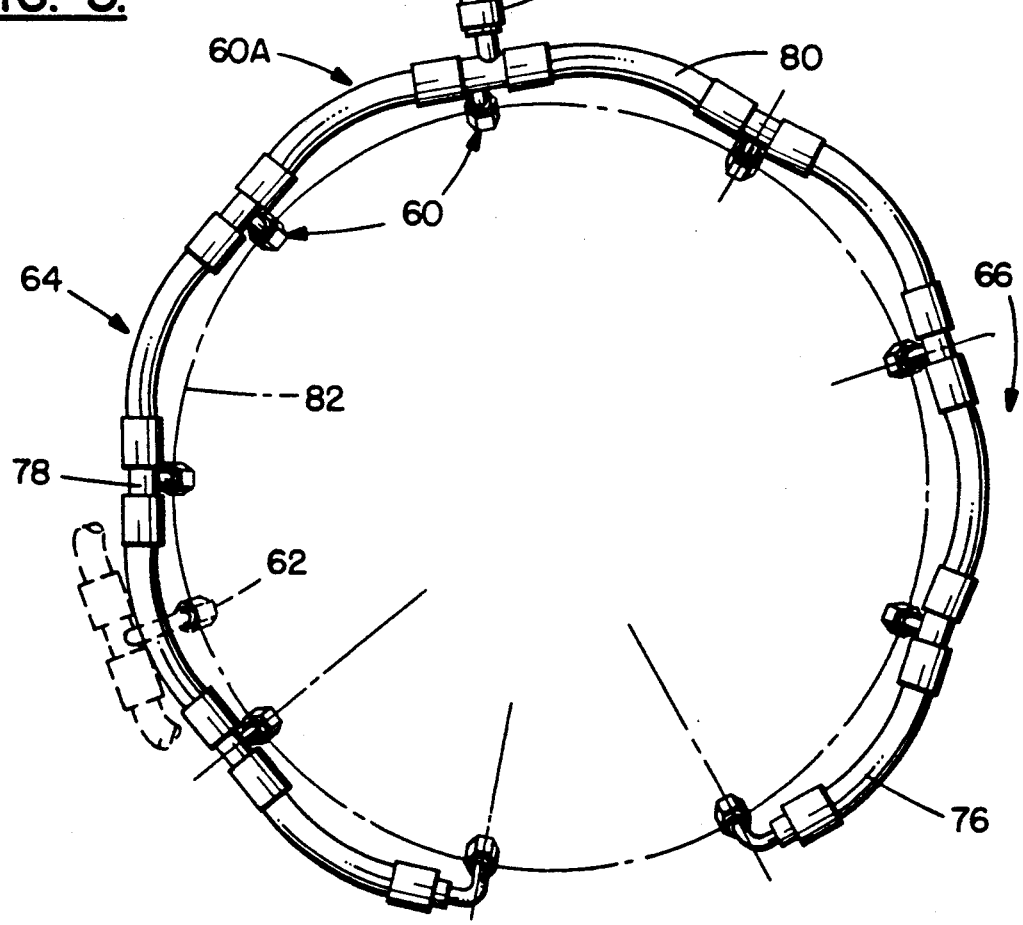
FIG. 3 is a front elevation view of a fuel manifold constructed according to the invention.
Figure 5:
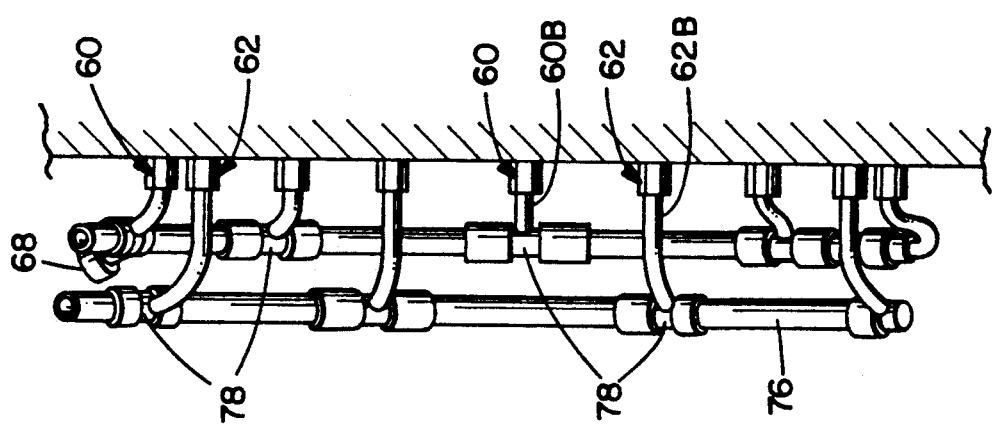
FIG. 5 is a detail side elevation view illustrating the side-by-side relationship of the two manifolds of the invention.

As best seen in FIGS. 1 and 5, each of the fuel injectors 60, 62 includes a nozzle 60B, 62B, respectively, the tips of which all lie in a common plane which is perpendicular to a centerline of the engine 20. Additionally, as seen in FIGS. 3 and 4, all of the nozzles for the fuel injectors 60, 62 lie on a common pitch circle 82. The reason for this relative equal positioning of the nozzles is to obtain very uniform distribution of fuel spray inside the combustor. In addition to the tips of the nozzles 60B and 62B lying in a common plane, it will also be appreciated that the nozzles 60B lie substantially circumferentially intermediate each pair of nozzles 62B, and visa versa. This is to assure that a substantially uniform cloud of atomized fuel is introduced into the primary combustion zone 54 and thereby assure uniform combustion throughout the combustor 38.

With the dual manifold design just described, it may be desirable, on occasion, to operate the engine 20 in a lower performance mode operating only the fuel injectors 60 of the manifold 60A or only the fuel injectors 62 of the manifold 62A.

This operation can be achieved by means of a suitable valve 84 which can selectively connect the source of fuel to either the fitting 68 or the fitting 74 or to both of them simultaneously when maximum performance is desired.

There are a number of significant benefits which flow from the construction just described. The invention provides a dual fuel distribution system which enables a delivery of fuel to the combustor 38 through either of the manifolds 60A or 62A or through both of them simultaneously. Operation in the former mode would be most economical while in the latter mode would provide optimum performance. Furthermore, the flexibility of the tubular sections 76 serves to substantially eliminate hoop and vibratory stresses which are significant in conventional designs. Such a construction further reduces concern for life cycle fatigue problems which have been of considerable concern in conventional designs. The invention also provides a significant benefit both at the time of original manufacture of the engine 20 and, subsequently, when maintenance is called for. By reason of the flexibility of the tubular sections 76, each of the fuel injectors 60, 62 can already have been fixed in placed at the time that the tubular sections 76 are attached. It will be appreciated that conventional designs do not enjoy this capability where the tubular sections are rigid. Because of this rigidity, it was previously necessary to connect each tubular section only after a predecessor section was in place and could not be installed to connect two adjacent T-fittings 78.

In short, the invention provides for maximum density of fuel nozzles within the combustor, and therefore improved efficiency, while assuring ease of assembly and maintenance of the system and while minimizing vibratory and temperature change stresses resulting in substantially increased resistance to life cycle fatigue.

While the preferred embodiment of the invention has been disclosed in detail, it should be understood by those skilled in the art that various other modifications may be made to the illustrated embodiment without departing from the scope of the invention as described in the specification and defined in the appended claims.

What is claimed is:

1. A fuel injection system for use in the combustor section of a gas turbine engine, said fuel injection system comprising:
   a first manifold of substantially toroidal configuration for supplying fuel to a plurality of first fuel injectors positioned at spaced circumferential locations including first outlet nozzles lying in a common plane at similar radial distances from a centerline of the engine, said first manifold including:
   first fitting means associated with each of the first fuel injectors and in communication therewith; and
   a plurality of first flexible tubular members, pliant at room temperature, interconnecting, respectively, each adjacent pair of said first fitting means; and
   a second manifold of substantially toroidal configuration for supplying fuel to a plurality of second fuel injectors positioned at spaced circumferential locations including second outlet nozzles lying in the common plane at similar radial distances from the centerline of the engine, the second outlet nozzles being positioned intermediate the first outlet nozzles, said second manifold including:
   second fitting means associated with each of the second fuel injectors and in communication therewith; and
   a plurality of second flexible tubular members, pliant at room temperature, interconnecting, respectively, each adjacent pair of said second fitting means.

2. A fuel injection system as set forth in claim 1 wherein said first and second manifolds lie in spaced apart planes substantially parallel to the common plane and substantially perpendicular to the centerline of the engine.

3. A fuel injection system as set forth in claim 1 wherein said first manifold includes:
   a first leg including a plurality of said first fitting means therein; and
   a second leg including a plurality of said first fitting means therein; and
   wherein said second manifold includes:
   a first leg including a plurality of said second fitting means therein; and
   a second leg including a plurality of said second fitting means therein, said first legs of said first and second manifolds being substantially coextensive and said second legs of said first and second manifolds being substantially coextensive.

4. A fuel injection system as set forth in claim 1 including:
   a first fuel inlet fitting for connection to a source of fuel; and
   a pair of third flexible tubular members interconnecting, respectively, said first fuel inlet fitting and an initial one of said first fitting means in said first leg and in said second leg of said first manifold; and
   a second fuel inlet fitting for connection to a source of fuel; and
   a pair of fourth flexible tubular members interconnecting, respectively, said second fuel inlet fitting and an initial one of said second fitting means in said first leg and in said second leg of said second manifold.

5. A fuel injection system for use in the combustor section of a gas turbine engine, said fuel injection system comprising:
   a plurality of first fuel injectors positioned at spaced circumferential locations including first outlet nozzles lying in a common plane at similar radial distances from a centerline of the engine;

a first manifold of substantially toroidal configuration for supplying fuel to a plurality of first fuel injectors including:

first fitting means associated with each of the first fuel injectors and in communication therewith; and a plurality of first flexible tubular members, pliant at room temperature, interconnecting, respectively, each adjacent pair of said first fitting means; and a plurality of second fuel injectors positioned at spaced circumferential locations including second outlet nozzles lying in the common plane at similar radial distances from the centerline of the engine, the second outlet nozzles being positioned intermediate the first outlet nozzles;

a second manifold of substantially toroidal configuration for supplying fuel to a plurality of second fuel injectors including:

second fitting means associated with each of the second fuel injectors and in communication therewith; and a plurality of second flexible tubular members, pliant at room temperature, interconnecting, respectively, each adjacent pair of said second fitting means.

6. A fuel injection system as set forth in claim 5 wherein said first and second manifolds lie in spaced planes substantially parallel to the common plane and substantially perpendicular to the centerline of the engine.

7. A fuel injection system as set forth in claim 5 wherein said first manifold includes:

a first leg including a plurality of said first fitting means therein; and a second leg including a plurality of said first fitting means therein; and wherein said second manifold includes:

a first leg including a plurality of said second fitting means therein; and a second leg including a plurality of said second fitting means therein, said first legs of said first and second manifolds being substantially coextensive and said second legs of said first and second manifolds being substantially mutually coextensive.

8. A fuel injection system as set forth in claim 5 including:

a first fuel inlet fitting for connection to a source of fuel; and a pair of third flexible tubular members interconnecting, respectively, said first fuel inlet fitting and an initial one of said first fitting means in said first leg and in said second leg of said first manifold; and a second fuel inlet fitting for connection to a source of fuel; and a pair of fourth flexible tubular members interconnecting, respectively, said second fuel inlet fitting and an initial one of said second fitting means in said first leg and in said second leg of said second manifold.

9. In combination with a gas turbine engine including a compressor, a combustor section, and a turbine, a fuel injection system comprising:

a plurality of first fuel injectors positioned at spaced circumferential locations on said combustor section including first outlet nozzles lying in a common plane at similar radial distances from a centerline of said engine;

a first manifold of substantially toroidal configuration for supplying fuel to a plurality of first fuel injectors including:

first fitting means associated with each of the first fuel injectors and in communication therewith; and a plurality of first flexible tubular members, pliant at room temperature, interconnecting, respectively, each adjacent pair of said first fitting means; and a plurality of second fuel injectors positioned at spaced circumferential locations on said combustor section including second outlet nozzles lying in the common plane at similar radial distances from the centerline of said engine, said second outlet nozzles being positioned, circumferentially, intermediate said first outlet nozzles;

a second manifold of substantially toroidal configuration for supplying fuel to a plurality of second fuel injectors including:

second fitting means associated with each of the second fuel injectors and in communication therewith; and a plurality of second flexible tubular members, pliant at room temperature, interconnecting, respectively, each adjacent pair of said second fitting means.

10. A fuel injection system as set forth in claim 9 wherein said first and second manifolds lie in spaced planes substantially parallel to the common plane and substantially perpendicular to the centerline of said engine.

11. A fuel injection system as set forth in claim 9 wherein said first manifold includes:

a first leg including a plurality of said first fitting means therein; and a second leg including a plurality of said first fitting means therein; and wherein said second manifold includes:

a first leg including a plurality of said second fitting means therein; and a second leg including a plurality of said second fitting means therein, said first legs of said first and second manifolds being substantially coextensive and said second legs of said first and second manifolds being substantially coextensive.

12. A fuel injection system as set forth in claim 9 including:

a first fuel inlet fitting for connection to a source of fuel; and a pair of third flexible tubular members interconnecting, respectively, said first fuel inlet fitting and a initial one of said first fitting means in said first leg and in said second leg of said first manifold; and a second fuel inlet fitting for connection to a source of fuel; and a pair of fourth flexible tubular members interconnecting, respectively, said second fuel inlet fitting and an initial one of said second fitting means in said first leg and in said second leg of said second manifold.

13. A fuel injection system as set forth in claim 9 including:

valve means for selectively connecting either or both of said first and second manifolds to the source of fuel.

* * * * *

UNITED STATES PATENT AND TRADEMARK OFFICE
CERTIFICATE OF CORRECTION

PATENT NO. : 5,211,005
DATED : May 18, 1993
INVENTOR(S) : Hovnanian

It is certified that error appears in the above-indentified patent and that said Letters Patent is hereby corrected as shown below:

Column 7, line 4, delete [a plurality of] and insert --said--.
Column 7, line 19, delete [a plurality of] and insert --said--.
Column 7, line 21, delete [the] and insert --said--.

Column 8, line 19, delete [a plurality of] and insert --said--.

Column 8, line 52, delete [a] and insert --an--.

Signed and Sealed this

Fourteenth Day of December, 1993

Attest:

BRUCE LEHMAN

*Attesting Officer*            *Commissioner of Patents and Trademarks*